United States Patent
Chung et al.

(10) Patent No.: US 10,612,612 B2
(45) Date of Patent: Apr. 7, 2020

(54) SOLID TYPE BRAKE DISC AND MANUFACTURING METHOD OF THE SAME

(71) Applicants: Hyundai Motor Company, Seoul (KR); Kia Motors Corporation, Seoul (KR); Hyundai Sungwoo Casting Co., Ltd., Seoul (KR)

(72) Inventors: Min Gyun Chung, Seongnam-si (KR); Jai Min Han, Suwon-si (KR); Yoon Cheol Kim, Suwon-si (KR); Byung Chan Lee, Suwon-si (KR); Yoon Joo Rhee, Suwon-si (KR); Jae Young Lee, Yongin-si (KR); In Seop Kim, Pohang-si (KR); Jeong Ho Shin, Daegu (KR)

(73) Assignees: Hyundai Motor Company, Seoul (KR); Kia Motors Corporation, Seoul (KR); Hyundai Sungwoo Casting Co., Ltd., Seoul (KR)

( * ) Notice: Subject to any disclaimer, the term of this patent is extended or adjusted under 35 U.S.C. 154(b) by 14 days.

(21) Appl. No.: 15/796,378

(22) Filed: Oct. 27, 2017

(65) Prior Publication Data
US 2018/0142745 A1     May 24, 2018

(30) Foreign Application Priority Data

Nov. 22, 2016 (KR) .......... 10-2016-0155431
Aug. 30, 2017 (KR) .......... 10-2017-0110275

(51) Int. Cl.
*F16D 65/12* (2006.01)
*F16D 65/02* (2006.01)

(52) U.S. Cl.
CPC ......... *F16D 65/123* (2013.01); *F16D 65/125* (2013.01); *F16D 2065/1316* (2013.01);
(Continued)

(58) Field of Classification Search
CPC ............ F16D 65/12; F16D 2065/1316; F16D 2065/1328; F16D 2200/0013;
(Continued)

(56) References Cited

U.S. PATENT DOCUMENTS 3,412,836 A * 11/1968 Wilmer ................... F16D 13/64
                                                  188/218 XL
4,043,431 A *  8/1977 Ellege ................ B23Q 17/0976
                                                   188/218 A
(Continued)

FOREIGN PATENT DOCUMENTS

JP           5393876 B2    1/2014
KR         101355613 B1    1/2014
(Continued)

*Primary Examiner* — Bradley T King
*Assistant Examiner* — Mahbubur Rashid
(74) *Attorney, Agent, or Firm* — Slater Matsil, LLP

(57) ABSTRACT

A solid type brake disc includes a hat part that includes a circular body that is fitted on a rotary shaft of a wheel and a plurality of hollow protrusions that are formed around the outer surface of the body and each have an internal space. The solid type brake disc also includes a friction part that includes a ring body that has a center hole and receives the hat part in the center hole and projections that protrude toward the hollow protrusions and are inserted in the internal spaces to be covered with the hollow protrusions.

17 Claims, 13 Drawing Sheets

(52) U.S. Cl.
CPC .............. *F16D 2065/1344* (2013.01); *F16D 2065/1376* (2013.01); *F16D 2200/0013* (2013.01); *F16D 2250/003* (2013.01); *F16D 2250/0015* (2013.01)

(58) Field of Classification Search
CPC ........... F16D 2065/1344; F16D 65/123; F16D 2250/0015; F16D 65/125; F16D 2065/1356; F16D 2065/1368; F16D 2250/0007; F16D 2065/1364; F16D 2065/1376; F16D 2065/134
See application file for complete search history.

(56) References Cited

U.S. PATENT DOCUMENTS

| | | | | |
|---|---|---|---|---|
| 4,708,041 | A * | 11/1987 | Granger | B23B 31/40 269/52 |
| 5,297,660 | A * | 3/1994 | Wiebelhaus | F16D 65/123 188/18 A |
| 5,823,303 | A | 10/1998 | Schwarz et al. | |
| 6,035,978 | A | 3/2000 | Metzen et al. | |
| 6,152,270 | A * | 11/2000 | Giorgetti | F16D 65/12 188/18 A |
| 6,321,885 | B1 | 11/2001 | Wendt | |
| 6,523,651 | B2 | 2/2003 | Schaus et al. | |
| 7,543,691 | B2 * | 6/2009 | Hopkins | F16D 65/12 188/218 XL |
| 8,939,266 | B2 | 1/2015 | Anderson | |
| 9,027,718 | B2 | 5/2015 | Hanna et al. | |
| 2002/0104721 | A1 * | 8/2002 | Schaus | F16D 65/12 188/218 XL |
| 2004/0084262 | A1 * | 5/2004 | Baylis | F16D 3/06 188/218 XL |
| 2006/0213732 | A1 * | 9/2006 | Leevy | F16D 65/12 188/218 XL |
| 2006/0243547 | A1 * | 11/2006 | Keller | F16D 65/12 188/218 XL |
| 2007/0246314 | A1 * | 10/2007 | Schorn | F16D 65/12 188/218 XL |
| 2009/0020379 | A1 * | 1/2009 | Hanna | B22D 19/00 188/218 XL |
| 2010/0084231 | A1 * | 4/2010 | Biondo | F16D 65/12 188/218 XL |
| 2011/0061980 | A1 * | 3/2011 | Anderson | B22C 9/10 188/218 XL |
| 2011/0259682 | A1 | 10/2011 | Mueller | |
| 2011/0266103 | A1 * | 11/2011 | Mueller | F16D 65/123 188/218 XL |
| 2011/0290602 | A1 | 12/2011 | Kleber et al. | |
| 2012/0125725 | A1 * | 5/2012 | Tironi | F16D 65/12 188/218 XL |
| 2012/0175202 | A1 * | 7/2012 | Pahle | F16D 65/123 188/218 XL |
| 2013/0037359 | A1 * | 2/2013 | Kim | F16D 65/12 188/218 XL |
| 2013/0323525 | A1 * | 12/2013 | Popescu | F16D 65/127 428/596 |
| 2014/0000995 | A1 * | 1/2014 | Hentrich | F16D 65/123 188/218 XL |
| 2014/0041974 | A1 | 2/2014 | Kim et al. | |
| 2014/0124309 | A1 * | 5/2014 | Kim | F16D 65/123 188/218 XL |
| 2014/0174864 | A1 * | 6/2014 | Bouvier | F16D 65/123 188/218 XL |
| 2014/0224602 | A1 * | 8/2014 | Saame | F16D 65/12 188/218 XL |
| 2014/0326551 | A1 | 11/2014 | Anderson | |
| 2015/0136546 | A1 | 5/2015 | Kim et al. | |
| 2015/0323025 | A1 * | 11/2015 | Muruzabal Rivero | F16D 65/128 188/218 XL |
| 2018/0142745 | A1 | 5/2018 | Chung et al. | |

FOREIGN PATENT DOCUMENTS

| | | |
|---|---|---|
| KR | 20140084734 A | 7/2014 |
| KR | 101526585 B1 | 6/2015 |
| KR | 20150061665 A | 6/2015 |

* cited by examiner

SOLID TYPE BRAKE DISC AND MANUFACTURING METHOD OF THE SAME

CROSS-REFERENCE TO RELATED APPLICATIONS

The present application claims priority to Korean Patent Application No. 10-2016-0155431, filed Nov. 22, 2016, and Korean Patent Application No. 10-2017-0110275, filed Aug. 30, 2017, the entire contents of which is incorporated herein for all purposes by this reference.

TECHNICAL FIELD

The present invention relates to a solid type brake disc and a method of manufacturing the same.

BACKGROUND

Solid type brake discs in the related art have a hat part and a friction part that are integrated, and are used for rear wheels where load attributable to heat and torque is smaller than at front wheels. However, the brake discs have spatial limitations due to the integrated configuration.

Accordingly, the present invention introduces a solid type brake disc that can overcome the spatial limitations by reducing the thickness and weight, as compared with the related art, through a firm coupling structure of a hat part and a friction part.

The description provided above as a related art of the present invention is just for helping understanding the background of the present invention and should not be construed as being included in the related art known by those skilled in the art.

The foregoing is intended merely to aid in the understanding of the background of the present invention, and is not intended to mean that the present invention falls within the purview of the related art that is already known to those skilled in the art.

SUMMARY

Embodiments of the present invention relate to a solid type brake disc comprising a hat part and a friction part firmly coupled to each other through a bridge that is a coupler thereof.

According to a first embodiment, a solid type brake disc includes a hat part including a circular body that is fitted on a rotary shaft of a wheel and a plurality of hollow protrusions that are formed around the outer surface of the body and each have an internal space. The solid type brake disc also includes a friction part that includes a ring body that has a center hole and receives the hat part in the center hole and projections that protrude toward the hollow protrusions and are inserted in the internal spaces to be covered with the hollow protrusions.

The hollow protrusions may form bonding surfaces by coming in contact with the inner surface of the center hole at ends, and the bonding surfaces may be lathed.

The projections may be each divided into a first projecting portion protruding on the inner surface and tapered toward an end close to an axis and a second projecting portion extending from the first projecting portion and increasing in thickness moving toward an end, and the thickness at the boundary of the first projecting portion and the second projecting portion may be smallest.

The width of the projections may decrease moving toward an end.

The ratio of the distance that each projection protrudes from the inner side of the center hole to the distance from the end of the projection to the outer surface of the ring body may be within a range of 0.20 to 0.25.

The ratio of the thickness at the boundary between the first projecting portion and the second projecting portion to the thickness of the ring body may be determined within the range of 0.35 to 0.40.

The second projecting portion may be slanted upward and downward at the boundary between the first projecting portion and the second projecting portion, for example, may be slanted at 2 to 3° from a virtual line extending in the radial direction at the top and the bottom of the boundary between the first projecting portion and the second projecting portion.

Bridges may be formed by the hollow protrusions and the projections and arranged with same intervals around the outer surface and the inner surface, and discharge holes may be formed between the bridges.

The number of the bridges may be nine.

Each of the hollow protrusions may have an insertion hole formed therein, which is open in the radial direction of the hat part to form an entrance through which the projection is inserted into the internal space.

Each of the hollow protrusions may have an air vent formed therethrough separately from the insertion hole to allow the air vent to be in air communication with the internal space. The air vent can be open in the axial direction of the hat part, so that the air vent can be interconnected to the internal space.

A method of manufacturing a solid type brake disc is provided according to another aspect of the present invention. A first forming step forms a hat part including a circular body that is fitted on a rotary shaft of a wheel and a plurality of hollow protrusions that are formed around the outer side of the body and each have an internal space. An inserting step inserts the hat part into a mold. A second forming step forms a friction part including a ring body that has a center hole and receives the hat part in the center hole and projections that protrude toward the hollow protrusions and are inserted in the internal spaces to be covered with the hollow protrusions through casting.

In the first forming step and the second forming step, cast iron may be used for casting the hat part and the friction part, and the cast iron for the hat part may be larger in strength than the cast iron for the friction part.

The method may further include a machining step that lathes the ends of the hollow protrusions after the first forming step.

According to the solid type brake disc of the present invention, since the hat part and the friction part are separately formed and then combined, the hat part and the friction part can be stably combined by the hollow protrusions and the projections fitted to each other.

Accordingly, it is possible to resist the load of torque and overcome spatial limitations because the hat part and the friction part are separately formed and then combined. Therefore, it is possible to reduce the weight of the product.

In the first forming step, insertion holes and air vents formed separately from the insertion holes may be formed. Each of the projections is inserted into each of the hollow protrusions through each of the insertion holes, and each of the air vents is in air communication with each of the internal spaces.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinafter, exemplary embodiments of the present invention will be described in detail with reference to the accompanying drawings.

Figure 1:
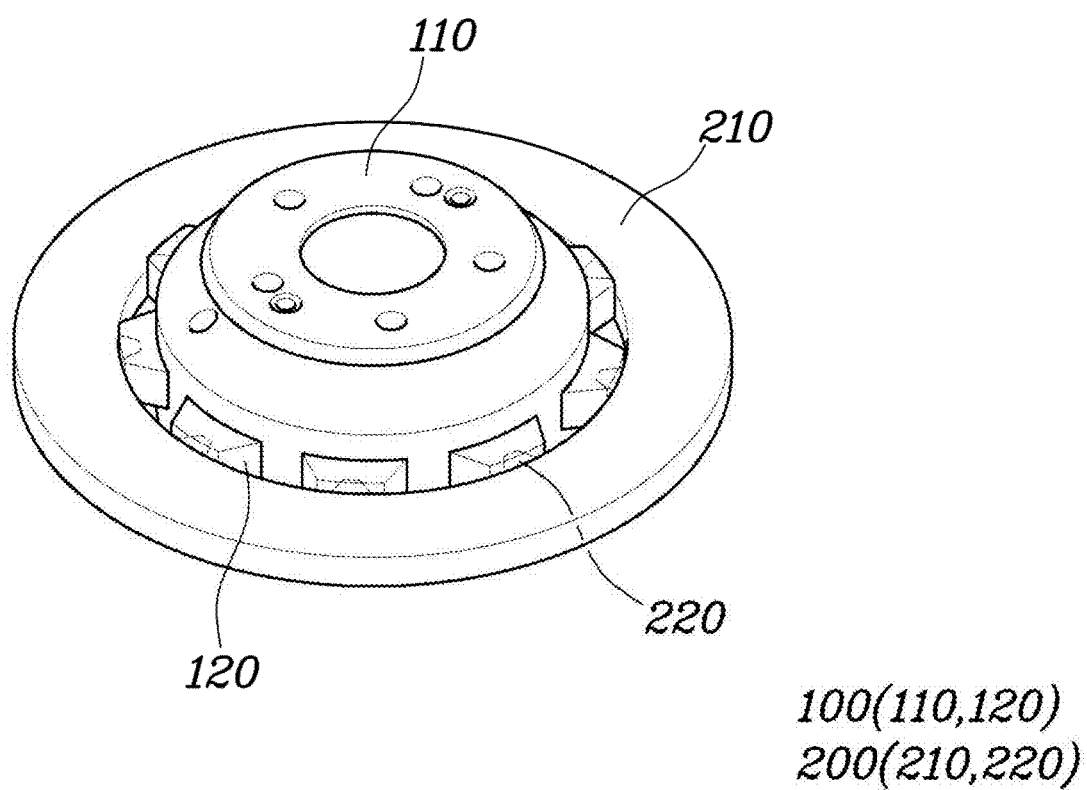
FIG. 1 is a view showing a solid type brake disc according to a first embodiment of the present invention.
Figure 2:
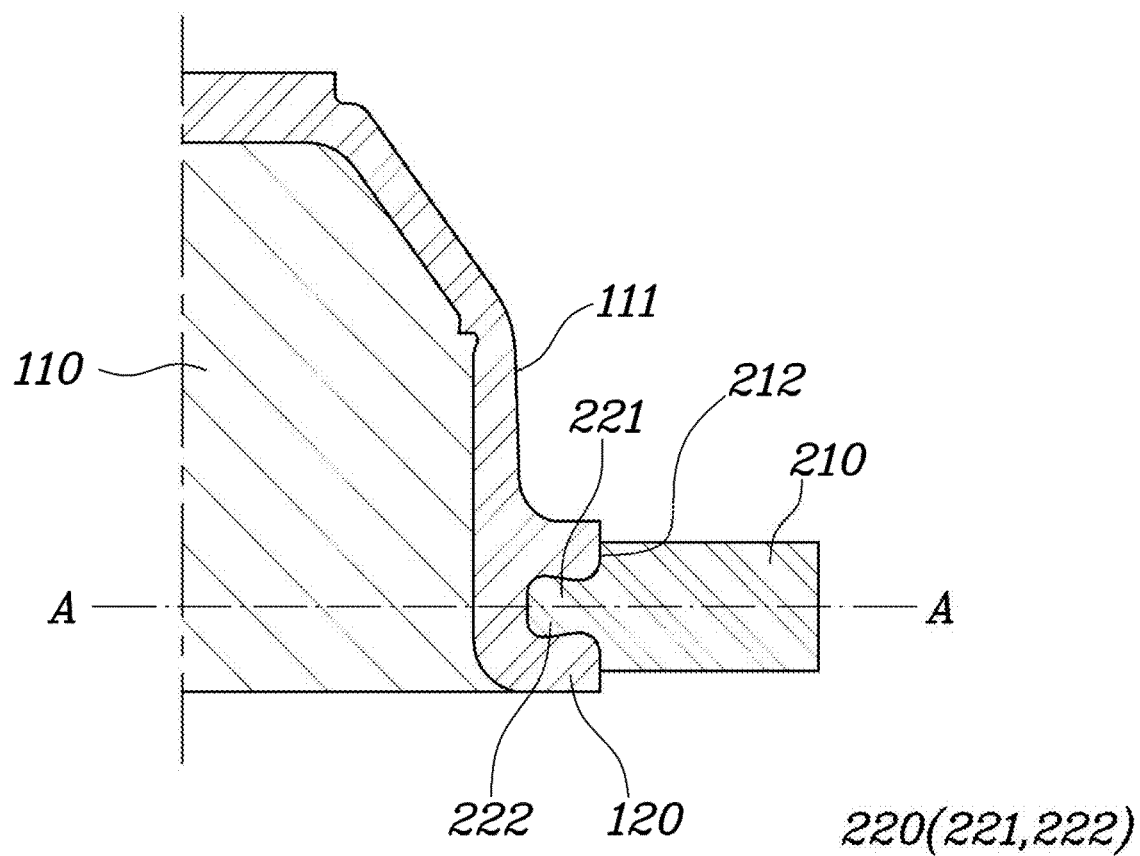
FIG. 2 is a view showing a cross-section of the solid type brake disc according to the first embodiment of the present invention.
Figure 3:
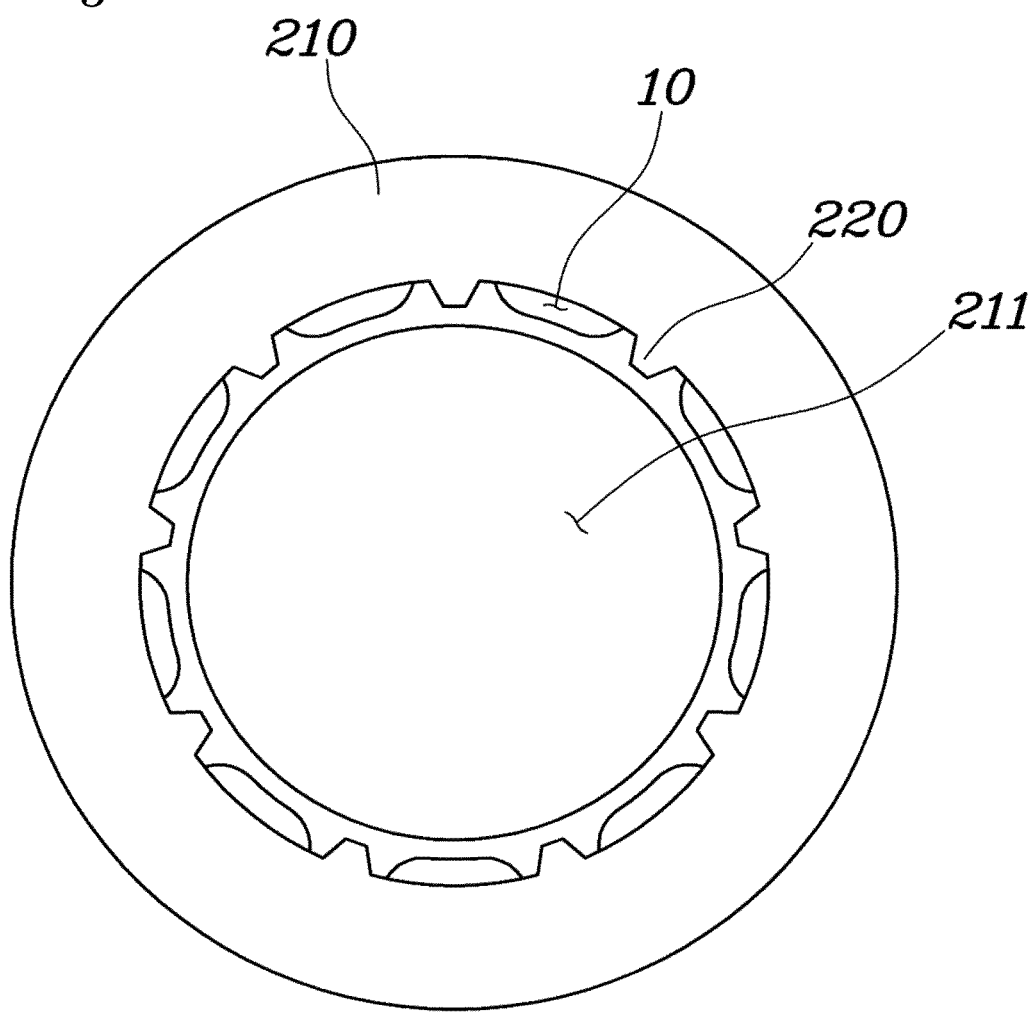
FIG. 3 is a cross-sectional view taken along line A-A in FIG. 2.
Figure 4:
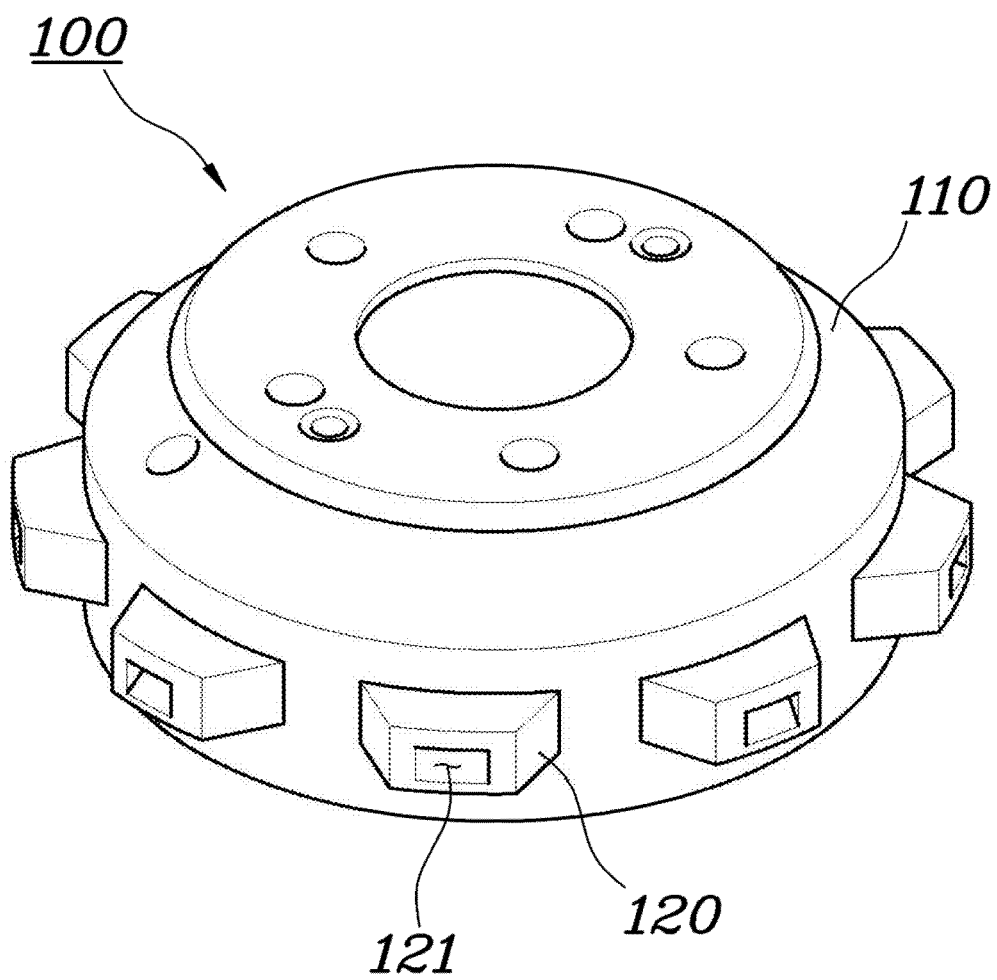
FIG. 4 is a view showing a hat part according to the first embodiment of the present invention.

Referring to FIGS. 1 to 3, in a solid type brake disc according to the first embodiment of the present invention, a hat part 100 includes a circular body no that is fitted on a rotary shaft of a wheel and a plurality of hollow protrusions 120 that are formed around the outer surface in of the body no and each have an internal space 121 (see FIG. 4). A friction part 200 includes a ring body 210 that has a center hole 211 and receives the hat part 100 in the center hole 211 and projections 220 that protrude toward the hollow protrusions 120 and are inserted in the internal spaces 121 to be covered with the hollow protrusions 120.

The entrance of the internal space 121 into which each projection 220 is inserted, that is, the open portion of each hollow protrusion 120 is referred to as an insertion hole 123 for the convenience of description.

The hat part 100 is fitted on the rotary shaft of a wheel to be coupled to a car body. Referring to FIG. 4, the body 110 of the hat part 100 is a circular member and has a circular outer surface 111. The hollow protrusions 120 are formed circumferentially on the outer surface 111. The hollow protrusions 120 of the hat part 100 are parts that are coupled to a friction part 200 to be described below. The hollow protrusions 120 may be formed with regular intervals. The internal spaces 121 are formed in the hollow protrusions 120.

The hat part 100 may be made of spheroidal graphite cast iron having high strength and it can be reduced in thickness and weight through partial reduction and can perform the function of parking.

Figure 5:
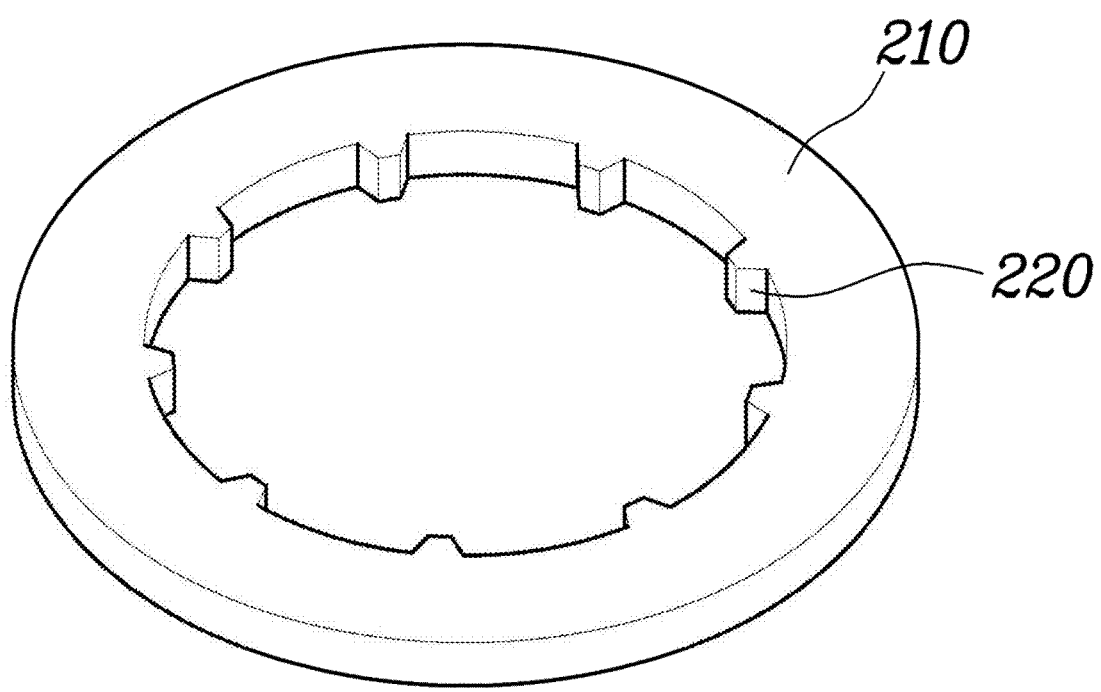
FIG. 5 is a view showing a friction part according to the first embodiment of the present invention.

The friction part 200 is a part generating mechanical friction for braking, as shown in FIG. 5, and the ring body 210 of the friction part 200 is formed in the shape of a ring having a center hole 211 and receives the hat part 100 in the center hole 211. The projections 220 corresponding in number and position to the hollow protrusions 120 are formed around the inner surface of the center hole 211. The projections 220 of the friction part 200 are directly coupled to the hollow protrusions 120 so that the hat part 100 and the friction part 200 are combined.

The projections 220 are inserted in the internal spaces 121 of the hollow protrusions 120. Accordingly, the hollow protrusions 120 cover the projections 220. Since the internal spaces 121 are formed in the hollow protrusions 120 and the projections 220 are inserted in the internal spaces 121, the projections 220 and the hollow protrusions 120 are in contact with each other.

The friction part 200 may be made of gray cast iron (flake graphite cast iron) having high thermal resistance and friction resistance and the same thermal expansion coefficient as spheroidal graphite cast iron.

The friction part 200 is a solid member having a specific hole for discharging heat. Solid type brake discs in the related art have an integrated hat part 100 and friction part 200 that are integrated, and are used for rear wheels where the load attributable to heat and torque is smaller than for the front wheels. However, the brake discs have spatial limitations due to the integrated configuration.

The hat part 100 and the friction part 200 are made of different materials, separately formed, and are stably combined by the hollow protrusions 120 and the projections 220 firmly fitted to each other, so the solid type brake disc according to the present invention can resist torque load. Further, since the hat part 100 and the friction part 200 are separately formed and then combined, it is possible to overcome spatial limitations. Accordingly, it is possible to reduce the weight of the product.

Referring to FIG. 2, the ends of the hollow protrusions 120 are in contact with the inner surface 212 of the center hole 211, thereby forming bonding surfaces 122, and the bonding surfaces 122 may be lathed.

According to the solid type brake disc of the present invention, as described above, the hat part 100 and the friction part 200 are supposed to be stably combined by firmly fitting the hollow protrusions 120 on the hat part 100 and the projections 220 on the friction part 200 to each other, so the projections 220 are inserted in the internal spaces 121 of the hollow protrusions 120 such that the ends of the hollow protrusions 120 are in contact with the inner surface 212 of the ring body 210, whereby it is possible to increase the coupling force.

The ends of the hollow protrusions 120 that are in contact with the inner side 212 of the center hole 211 of the ring body 210 form the bonding surfaces 122, and the bonding surfaces 122 are lathed, so it is possible to prevent deformation of the product. The other portions except the bonding surfaces 122 of the hollow protrusions 120 do not require specific machining in an as-cast state.

As shown in FIG. 2, the projections 220 are divided into a first projecting portion 221, protruding from the inner surface 212 and tapered toward the end close to the axis, and a second projecting portion 222, extending from the first projecting portion 221 and increasing in thickness toward an end thereof, the thickness at the boundary of the first projecting portion 221 and the second projecting portion 222 being the smallest.

Here, "thickness" may mean the distance from one axial end to the other axial end.

The first projecting portions 221 of the projections 220 are the portions that protrude from the inner surface 212 of the ring body 210, and may be reduced in thickness moving toward an end.

The second projecting portions 222 of the projections 220 are the portions extending from the first projecting portions 221 in the same direction as the first projecting portions 221. The second projecting portions 222 may be formed to be increased in thickness moving toward an end. The thickness at the boundary of the first projecting portion 221 and the second projecting portion 222 is smallest due to the characteristic of the shape, so the projections 220 can be prevented from being separated from the corresponding internal spaces 121 of the hollow protrusions 120.

Accordingly, the internal spaces 121 corresponding to the shapes of the projections 220 may also be formed such that the area of the cross-section perpendicular to the extension direction decreases moving toward the inside from the inlet and then increases.

As can be seen from FIG. 3 showing the cross-section taken along line A-A in FIG. 2, the width of the projections 220 may be decreased moving toward an end.

Here, "width" may mean, assuming that the projecting direction of the projections 220 is a longitudinal direction, the direction perpendicular to the longitudinal direction in the same plane.

As the width of the projections 220 decreases moving toward the end, when the friction part 200 is molded with the hat part 100 inserted in a mold, the mold can be completely filled with molten metal without an empty space, so the projections 220 can be firmly covered with the hollow protrusions 120.

Figure 6:
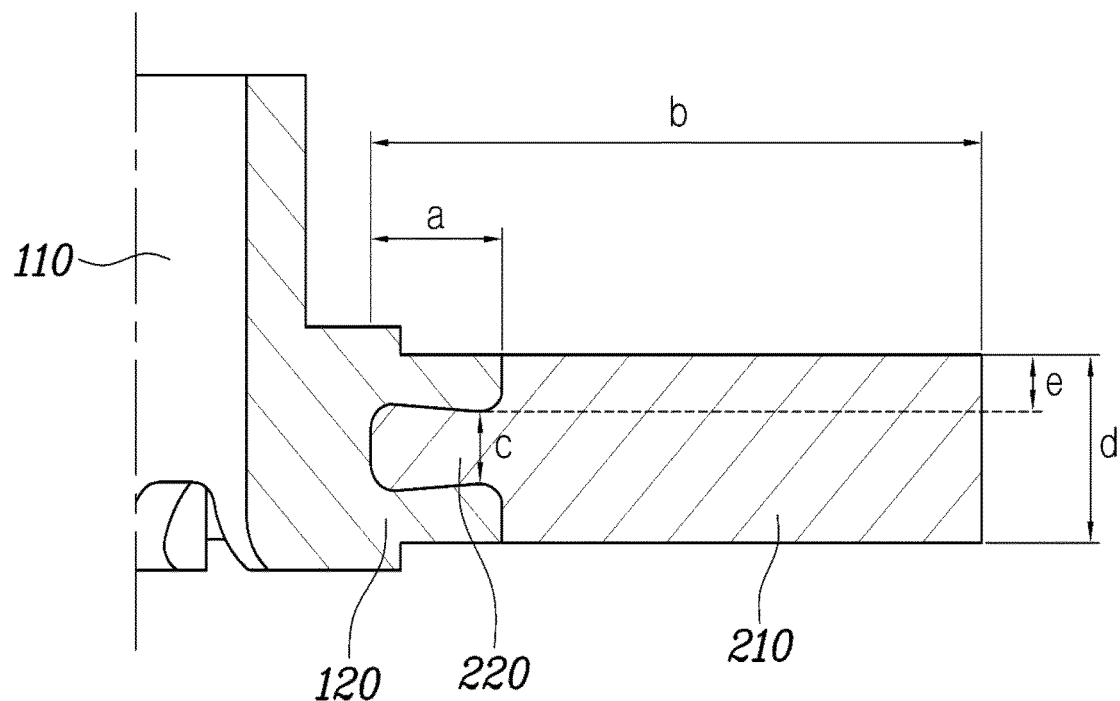
FIG. 6 is a view showing a cross-section of the solid type brake disc according to the first embodiment of the present invention.

Referring to FIG. 6, the ratio of the distance that the projection 220 protrudes from the inner surface 212 of the center hole 211 to the distance from the end of a projection 220 to the outer surface of the ring body 210 in the radial direction may be set within the range of 0.20~0.25.

The value obtained by dividing the distance (a) that the projection 220 protrudes from the inner surface 212 of the ring body 210 to the end by the distance (b) from the end of the projection 220 that is in contact with the outer surface 111 of the hat part 100 to the outer surface of the ring body may be 0.20 to 0.25.

When the ratio is less than 0.20, the area that resists torque applied in a rotational direction decreases, so it is difficult to efficiently distribute the stress. On the other hand, when the ratio is larger than 0.25, the lengths of the projections 220 are too large in comparison to the outer diameter of the ring body 210, so unstable shaking is caused when braking and the load is directly applied to the projections 220. Accordingly, it is difficult to ensure high structural strength and the maximum stress increases.

Therefore, it is reasonable to set the ratio of the distance that the projection 220 protrudes from the inner surface 212 of the center hole to the distance from the end of the projection 220 to the outer surface of the ring body 210 within the range of 0.20 to 0.25.

Detailed examples will be checked through the following Table 1.

TABLE 1

| Comparative Example 1 (ratio: 0.18) | | Embodiment (ratio: 0.23) | | Comparative Example 2 (ratio: 0.27) | |
|---|---|---|---|---|---|
| maximum stress in hat part | maximum stress in friction part | maximum stress in hat part | maximum stress in friction part | maximum stress in hat part | maximum stress in friction part |
| 163 MPa | 215 MPa | 145 MPa | 158 MPa | 164 MPa | 217 MPa |

In Comparative Example 1, the ratio of the distance that the projection 220 protrudes from the inner surface 212 of the center hole to the distance from the end of the projection 220 to the outer surface of the ring body is 0.18, so it can be seen that stress cannot be efficiently distributed and the maximum stress in the hat part 100 and the friction part 200 was increased by 12% and 36% in comparison to Embodiment.

In Comparative Example 2, the ratio of the distance that the projection 220 protrudes from the inner surface 212 of the center hole 211 to the distance from the end of the projection 220 to the outer surface of the ring body 210 is 0.27, so it can be seen that load is directly applied to the projections 220 and the maximum stress in the hat part 100 and the friction part 200 was increased by 13% and 37% in comparison to Embodiment.

Referring to FIG. 6, the ratio of the thickness at the boundary between the first projecting portion 221 and the second projecting portion 222 to the thickness of the ring body 210 may be determined within the range of 0.35 to 0.40.

The value obtained by dividing the thickness (c) at the boundary between the first projecting portion 221 and the second projecting portion 222 by the thickness (d) of the ring body 210 may be 0.35 to 0.40.

In general, the thickness should be 5 mm or more to achieve the shape when it is manufactured by casting. When the ratio of the thickness at the boundary between the first projecting portion 221 and the second projecting portion 222 to the thickness of the ring body 210 is less than 0.35, the thickness of the projections 220 may be the minimum thickness or less and casting defects may result. On the other hand, when the ratio of the thickness at the boundary between the first projecting portion 221 and the second projecting portion 222 to the thickness of the ring body 210 is larger than 0.40, the half thickness (e) of the thickness that is obtained by subtracting the thickness of the projection 220 from the thickness of the hollow protrusion 120 covering the projection 220 relatively decreases, whereby it is difficult to ensure structural strength against a load perpendicular to the friction surface.

Therefore, it is reasonable to set the ratio of the thickness at the boundary between the first projecting portion 221 and the second projecting portion 222 to the thickness of the ring body 210 within the range of 0.35 to 0.40.

Figure 7:
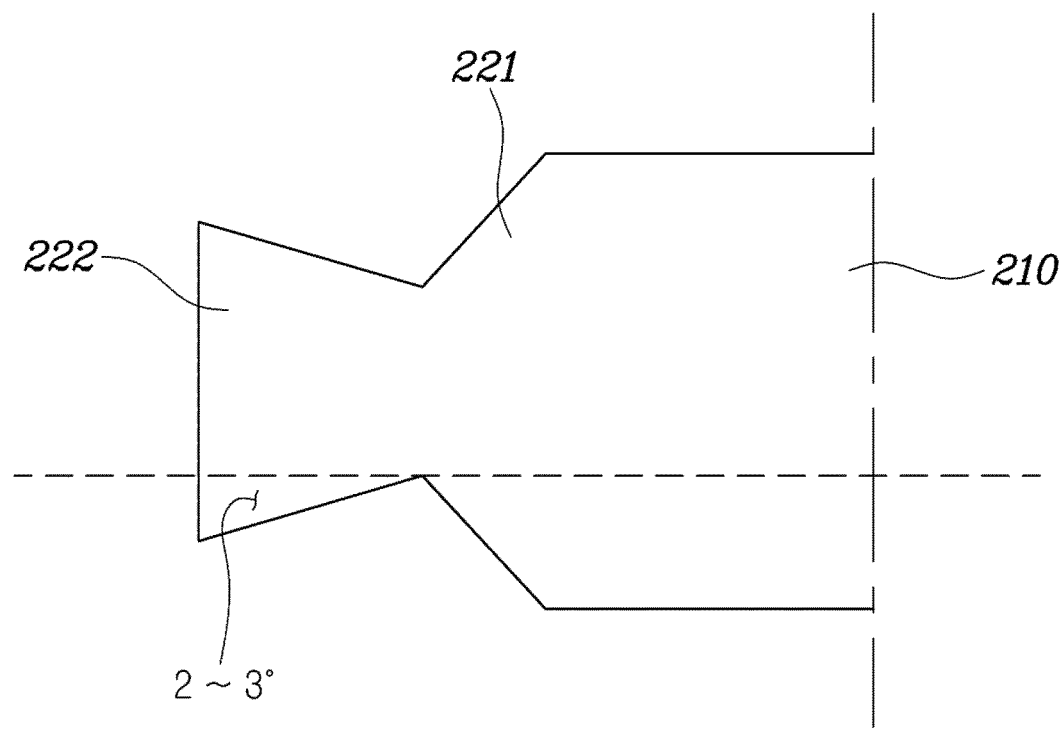
FIG. 7 is a view showing a side of a projection according to the first embodiment of the present invention.

Referring to FIG. 7, in the axial direction, upward and downward slants are formed at the boundary between the first projecting portion 221 and the second projecting portion 222, that is, upward and downward slants may be formed at an angle of 2 to 3° from a virtual line extending in the radial direction at the top and the bottom of the boundary between the first projecting portion 221 and the second projecting portion 222.

It is possible to control the upward and downward slants of the second projecting portion 222 from the virtual line extending in the radial direction at the top and the bottom of the boundary between the first projecting portion 221 and the second projecting portion 222 within the range of 2 to 3°.

When the projections 220 inserted in the hollow protrusions 120 are inclined upward and downward moving toward the ends, that is, when inverse gradients are formed, radial expansion due to heat is suppressed. Accordingly, it is possible to suppress deformation that causes shaking of the product.

When the half thickness (e) of the thickness that is obtained by subtracting the thickness of the projection 220 from the thickness of the hollow protrusion 120 covering the projection 220 does not satisfy 3.5 mm, the maximum stress may rapidly drop from about 186 MPa to about 166 MPa for 3.5 mm.

When the upward and downward slants of the projections 220 are less than 2°, it is difficult to expect the effect of the inverse gradients and it is also difficult to perform casting. On the other hand, when the upward and downward slants of the projections 220 are greater than 3°, the half thickness (e) of the thickness that is obtained by subtracting the thickness of the projection 220 from the thickness of the hollow protrusion 120 covering the projection 220 is 3.5 mm or less, so it is difficult to secure structural strength against stress perpendicular to the friction surface.

Therefore, it is reasonable to control the upward and downward slants from the virtual line extending in the radial direction at the top and the bottom of the boundary between the first projecting portion 221 and the second projecting portion 222 within the range of 2 to 3°.

Detailed examples will be checked through the following Table 2.

TABLE 2

|  | Comparative Example 1 (slant: 1°) | Embodiment (slant: 3°) | Comparative Example 2 (slant: 4°) |
|---|---|---|---|
| axially decreased thickness | 0.28 mm | 0.28 mm | 0.28 mm |
| thickness increased by slant | 0.38 mm | 1.16 mm | 1.54 mm |
| half thickness (e) of thickness obtained by subtracting thickness of projection from thickness of hollow protrusion covering projection | 3.94 mm | 3.55 mm | 3.36 mm |

In Embodiment and Comparative Examples, the thicknesses at the boundaries of a first projecting portion 221 and a second projecting portion 222 were all 5 mm.

In Comparative Example 1, the half thickness (e) of the thickness that is obtained by subtracting the thickness of the projection 220 from the thickness of the hollow protrusion 120 covering the projection 220 was 3.94 mm, so it satisfies the condition of 3.5 mm or more, but it is difficult in practice to achieve this shape. Further, in Comparative Example 1, the half thickness (e) of the thickness that is obtained by subtracting the thickness of the projection 220 from the thickness of the hollow protrusion 120 covering the projection 220 was 3.5 mm or less, so it is difficult to secure structural strength against a load perpendicular to the friction surface.

Bridges formed by the hollow protrusions 120 and the projections 220 are arranged at regular intervals around the outer surface in and the inner surface 212, so discharge holes can be formed between the bridges, and nine bridges may be formed.

In general, the mode shapes of brake discs are related to the relationship between heat islands and juddering that is shaking due to braking. When distribution of heat islands overlap each other in an out-of-plane (axial direction) bending mode of the mode shapes of brake discs, heat islands may be easily generated.

It is advantageous for the number of bridges that are formed by the hollow protrusions 120 and the projections 220 to be an odd number in order to avoid overlapping. When seven bridges are formed, it is disadvantageous in terms of structural strength, and when eleven bridges are formed, the weight is increased, which is disadvantageous in terms of reduction of weight. Accordingly, nine is a reasonable number of bridges.

Figure 8:
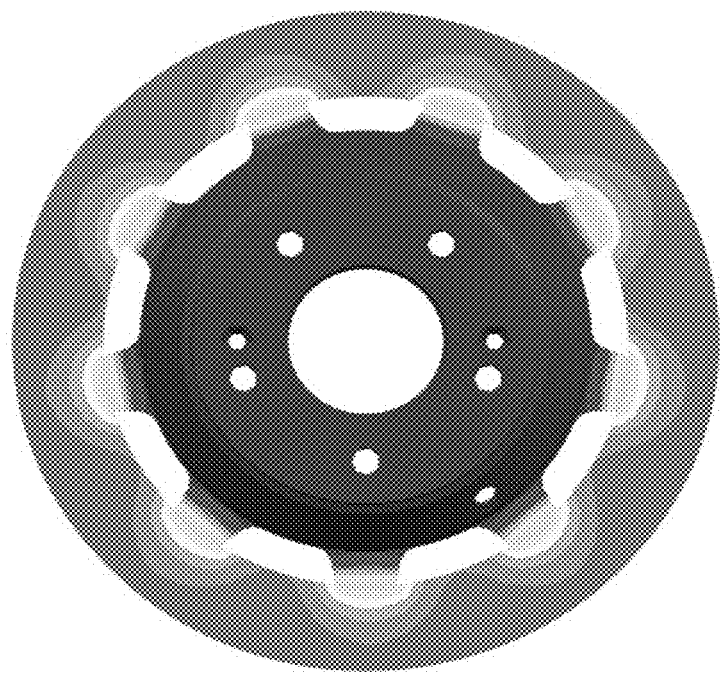
FIG. 8 is a view showing the distribution of heat islands in a solid type brake disc according to the first embodiment of the present invention.
Figure 9A:
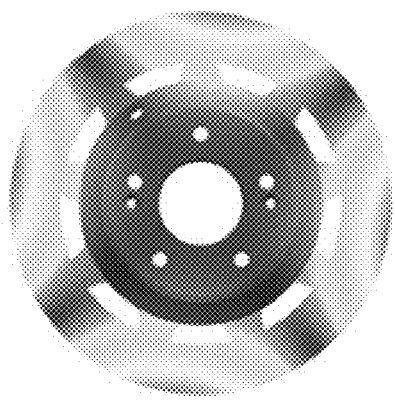
FIGS. 9A-9E is a view showing an out-of-plane (direction for axial) bending mode of the result of frequency response analysis of a solid type brake disc according to the first embodiment of the present invention.
Figure 9B:
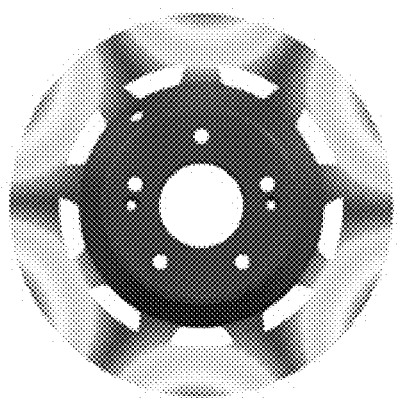
Figure 9C:
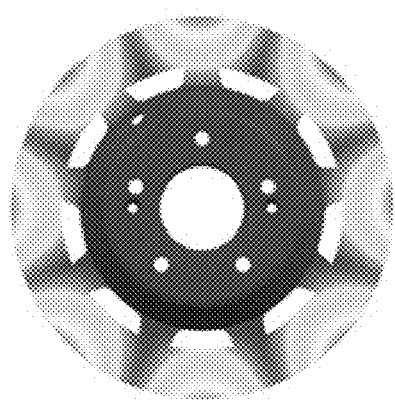
Figure 9D:
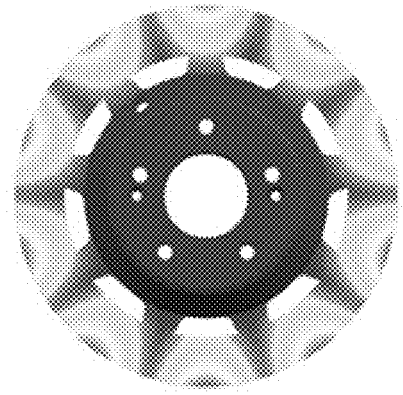
Figure 9E:
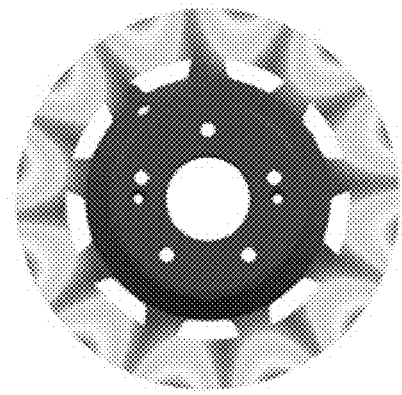
Figure 10:
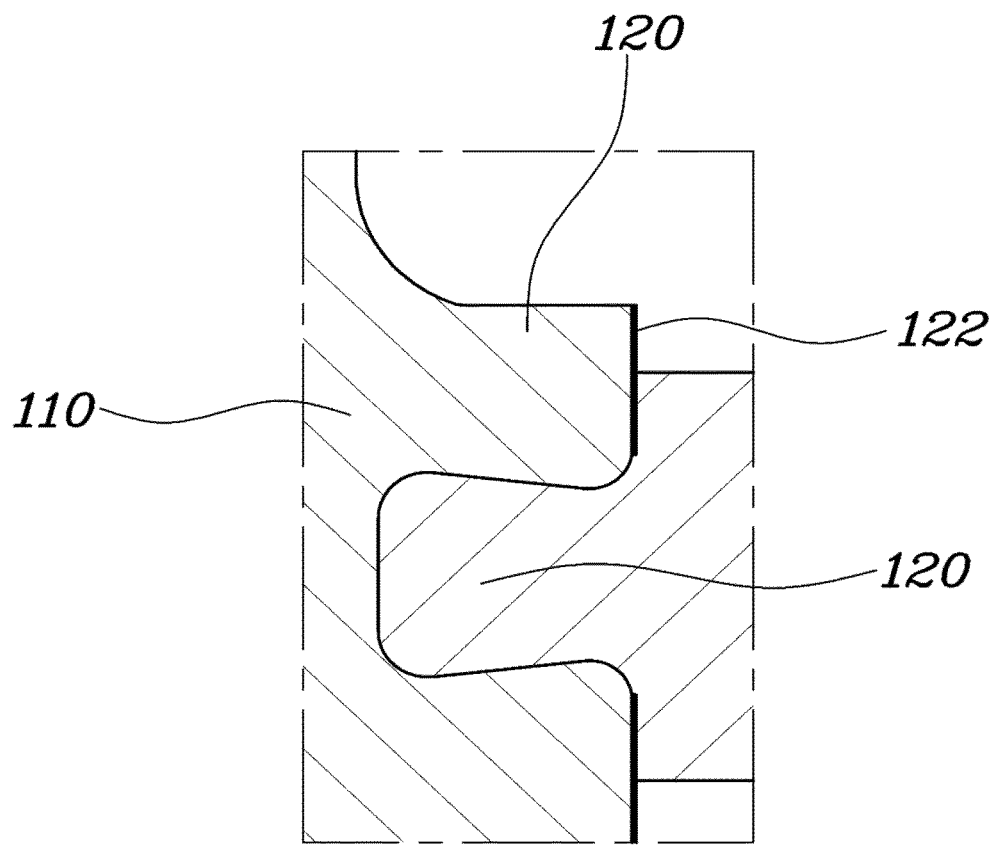
FIG. 10 is a view showing bonding surfaces that are lathed in accordance with the first embodiment of the present invention.
Figure 11:
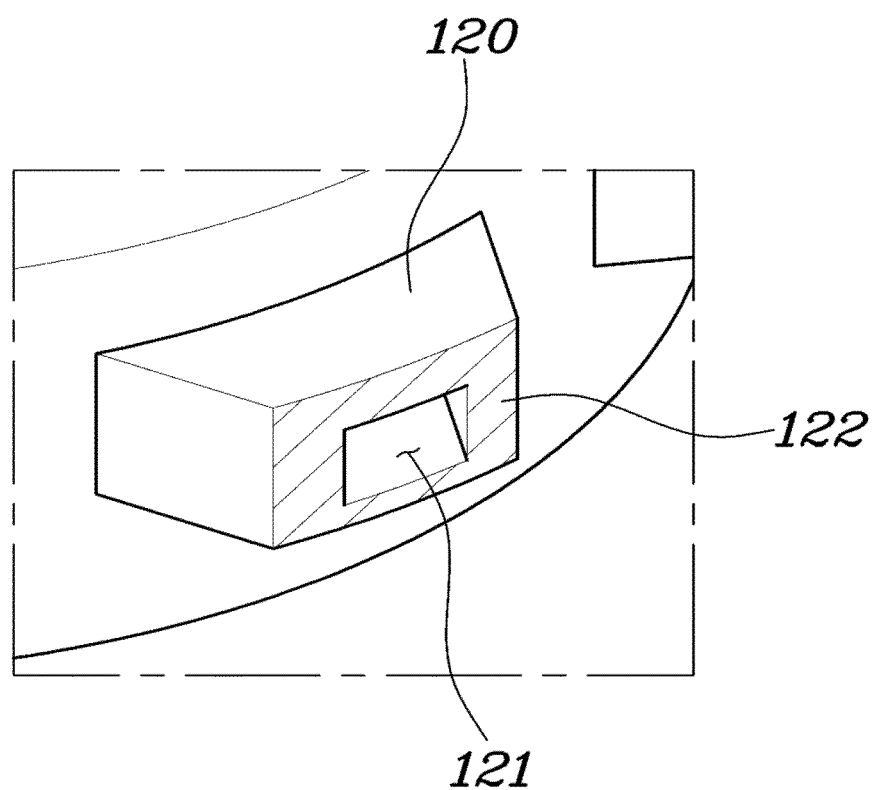
FIG. 11 is a view showing bonding surfaces that have are lathed in accordance with the first embodiment of the present invention.

When heat transfer analysis is performed on a brake disc with nine bridges, heat distribution is shown as in FIG. 8 and nine heat islands are shown.

The out-of-plane (axial direction) bending mode of the result of frequency response analysis on a brake disc is shown as in FIGS. 9A-9E, and the numbers of heat islands that can be generated in this case are four, six, eight, ten, and twelve, and do not overlap the number nine, according to the heat transfer analysis, so it is possible to reduce juddering.

Figure 12:
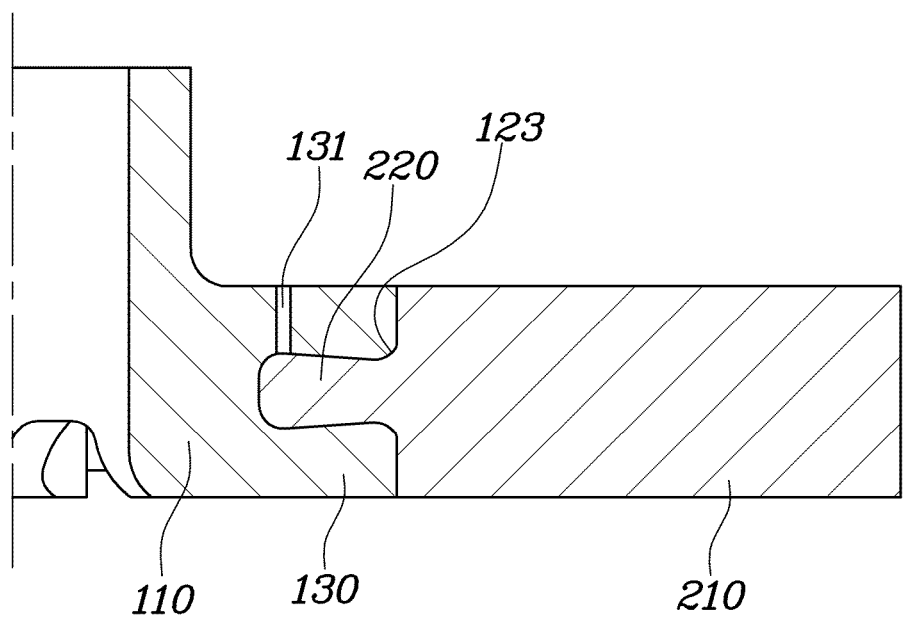
FIG. 12 is a view showing a cross-section of a solid type brake disc according to a second embodiment of the present invention.
Figure 13:
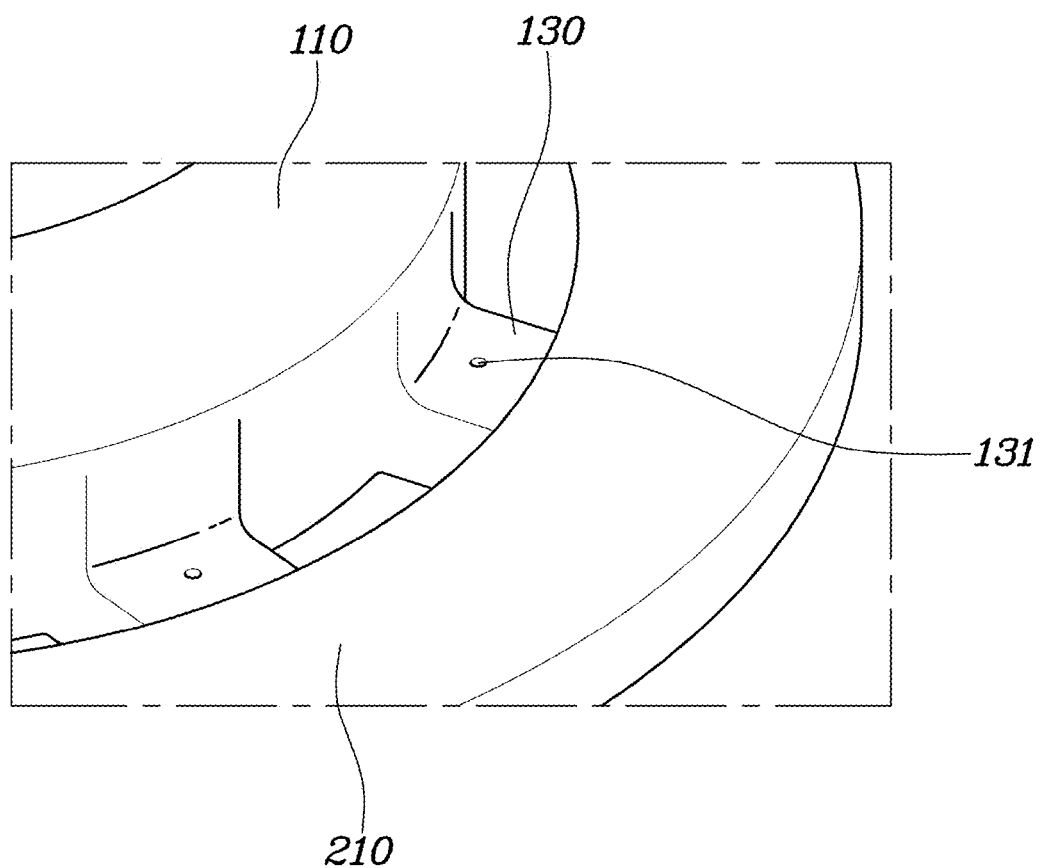
FIG. 13 is a view showing the solid type brake disc according to the second embodiment of the present invention.

Meanwhile, a solid type brake disc according to the second embodiment of the present invention fundamentally employs nearly the same configuration as that of the first embodiment, except for a hollow protrusion 130, which is partially different from the hollow protrusion 120 of the first embodiment. Specifically, as illustrated in FIGS. 12 and 13, the hollow protrusion 130 is different from the hollow protrusion 120 in that the former has an air vent 131 additionally formed therethrough.

The air vent 131 is formed in a different direction from the insertion hole 123 so as to allow the air vent 131 to be interconnected to the internal space 121. Further, the air vent 131 may perform as a passage for discharging air isolated in the internal space 121 during casting of the ring body part 210 and the projection 220.

The insertion hole 123 is formed in the hollow protrusion 130 in the radial direction of the hat part 100 or the body no, and the air vent 131 is formed through the hollow protrusion 130 in the axial direction of the hat part 100 or the body no, whereby the internal air of the internal space 121 is forcibly discharged through the air vent 131 by the molten metal introduced through the insertion hole 123, and the projection 220 completely occupies the internal space 121, so that the projection 220 and the hollow protrusion 130 can be securely coupled.

Therefore, it is possible to prevent occurrence of a problem in which the coupling force between the hollow protrusion 130 and the projection 220 is lowered due to an empty space formed in the internal space 121 inside the hollow protrusion 130 by isolating air in the internal space 121 which is not completely filled with the molten metal.

In addition, the molten metal solidifies a hook shape while partially filling inside the air vent 131, and thus can enhance the coupling force between the projection 220 and the hollow protrusion 130. That is, the solidified molten metal can perform a stopper function for preventing the projection 220 from moving in a direction in which the projection 220 escapes from the hollow protrusion 130.

A method of manufacturing a solid type brake disc according to the first embodiment of the present invention includes: a first forming step that forms a hat part 100 including a circular body 110 that is fitted on a rotary shaft of a wheel and a plurality of hollow protrusions 120 that are formed around the outer side 111 of the body 110 and each have an internal space 121; an inserting step that inserts the hat part 100 into a mold; and a second forming step that forms a friction part 200 including a ring body 210 that has a center hole 211 and receives the hat part 100 in the center hole 211 and projections 220 that protrude toward the hollow protrusions 120 and are inserted in the internal spaces 121 to be covered with the hollow protrusions 120 through casting.

The first forming step is may be performed by sand casting. In the second forming step, molten metal flows into the internal spaces 121 of the hollow protrusions 120 of the hat part 100 formed through the first forming step, so the projections 220 inserted in the internal spaces 121 and covered by the hollow protrusions 120 can be formed.

The hat part 100 may be pre-heated before the inserting step. The pre-heating temperature may be 450±50° C. The pre-heating is performed to improve fluidity of the molten metal in the projections 220 in casting with time differences.

In the first forming step and the second forming step, cast iron is used for casting the hat part 100 and the friction part 200, in which the cast iron for the hat part 100 may be stronger than the cast iron for the friction part 200.

Spheroidal graphite cast iron of 400 MPa or more may be used for the hat part 100 and gray cast iron of 200 MPa or more may be used for the friction part 200.

The method of manufacturing a solid type brake disc according to the present invention may further include a machining step that lathes the ends of the hollow protrusions 120 after the first forming step.

The ends of the hollow protrusions 120 are brought in contact with the inner side 212 of the ring body 210, so the coupling force can be increased. The ends of the protrusions 120 that are in contact with the inner side 212 of the center hole 211 of the ring body 210 form the bonding surfaces 122 and the bonding surfaces 122 are lathed through the machining step, so it is possible to prevent deformation of the product. However, the other portions except the bonding surfaces 122 of the protrusions 120 do not require specific machining in an as-cast state.

A method for manufacturing a solid type brake disc according to the second embodiment of the present invention has a similar configuration to that of the first embodiment, except for forming a hollow protrusion 130, a shape of which is partially different from that of the hollow protrusion 120 of the first embodiment.

That is, during the first forming step, the hollow protrusion 130 having an air vent 131, which is formed separately from an insertion hole 123 and is in air communication with the internal space 121, is formed. By the forming of the air vent 131 through the hollow protrusion 130, it is possible to prevent air isolation in the internal space 121 and compactly fill the internal space 121 with the molten metal introduced during the second forming step.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A solid type brake disc comprising:
    a hat part that includes a circular body designed to be fitted on a rotary shaft of a wheel and a plurality of hollow protrusions that are formed around an outer surface of the circular body, each hollow protrusion having an internal space; and
    a friction part that includes a ring body that has a center hole and projections extending into the center hole, wherein the hat part is received in the center hole so that the projections protrude toward the hollow protrusions, are inserted in the internal spaces and are covered by the hollow protrusions, wherein the hollow protrusions form bonding surfaces by coming in contact with an inner surface of the center hole at ends, wherein the hollow protrusions have insertion holes formed therein and air vents formed separately from the insertion holes, wherein each of the projections is inserted into each of the internal spaces through each of the insertion holes, and wherein each of the air vents is in air communication with each of the internal spaces.

2. The brake disc of claim 1, wherein the projections are each divided into a first projecting portion protruding on an inner surface and tapered toward an end close to an axis and a second projecting portion extending from the first projecting portion and increasing in thickness moving toward an end; and
    wherein a thickness at a boundary of the first projecting portion and the second projecting portion is smallest.

3. The brake disc of claim 2, wherein a ratio of the thickness at the boundary between the first projecting portion and the second projecting portion to a thickness of the ring body is within a range of 0.35 to 0.40.

4. The brake disc of claim 2, wherein the second projecting portion is slanted upward and downward at the boundary between the first projecting portion and the second projecting portion, the second projecting portion being slanted at 2 to 3° from a virtual line extending in a radial direction at a top and a bottom of the boundary between the first projecting portion and the second projecting portion.

5. The brake disc of claim 1, wherein the projections each have a width that decreases moving toward an end of the respective projection.

6. The brake disc of claim 1, wherein a ratio of the distance that each projection protrudes from an inner side of the center hole to a distance from an end of the projection to the outer surface of the ring body is within the range of 0.20 to 0.25.

7. The brake disc of claim 1, wherein bridges are formed by the hollow protrusions and the projections, the bridges arranged at constant intervals around the outer surface of the ring body and an inner surface of the center hole, wherein discharge holes are formed between the bridges.

8. The brake disc of claim 7, wherein nine bridges are formed by the hollow protrusions and the projections.

9. The brake disc of claim 1, wherein the hat part and the friction part are formed from cast iron.

10. The brake disc of claim 1, wherein each of the insertion holes is formed on a surface oriented in a radial direction of the hat part, among surfaces of each hollow protrusion, and wherein each of the air vents is formed through a surface oriented in an axial direction of the hat part, among the surfaces of each hollow protrusion, so as to allow each of the air vents to be interconnected to each of the internal spaces.

11. A method of manufacturing a solid type brake disc, the method comprising:
    inserting a hat part into a mold, the hat part including a circular body that is designed to be fitted on a rotary shaft of a wheel and a plurality of hollow protrusions that are formed around an outer side of the circular body, each hollow protrusion having an internal space; and forming a friction part through casting, the friction part including a ring body that has a center hole that receives the hat part, the friction part also including projections that protrude toward the hollow protrusions, are inserted in the internal spaces, and are covered with the hollow protrusions, wherein the hollow protrusions form bonding surfaces by coming in contact with an inner surface of the center hole at ends, wherein forming the hat part comprises forming insertion holes and air vents formed separately from the insertion holes, wherein each of the projections is inserted into each of the hollow protrusions through each of the insertion holes, and wherein each of the air vents is in air communication with each of the internal spaces.

12. The method of claim 11, further comprising forming the hat part.

13. The method of claim 12, wherein forming the hat part comprises using cast iron for casting the hat part.

14. The method of claim 13, wherein forming the friction part comprises using cast iron for casting the friction part.

15. The method of claim 14, the cast iron for the hat part is stronger than the cast iron for the friction part.

16. The method of claim 12, further comprising performing a machining step that lathes ends of the hollow protrusions after forming the hat part.

17. A car comprising:

a car body;

a wheel coupled to the car body, the wheel including a rotary shaft; and a brake disc comprising a hat part that includes a circular body fitted on the rotary shaft of the wheel and a plurality of hollow protrusions that are formed around an outer surface of the circular body, each hollow protrusion having an internal space, the brake disc also comprising a friction part that includes a ring body that has a center hole and projections extending into the center hole, wherein the hat part is received in the center hole so that the projections protrude toward the hollow protrusions, are inserted in the internal spaces and are covered by the hollow protrusions, wherein the hollow protrusions form bonding surfaces by coming in contact with an inner surface of the center hole at ends, wherein the hollow protrusions have insertion holes formed therein and air vents formed separately from the insertion holes, wherein each of the projections is inserted into each of the internal spaces through each of the insertion holes, and wherein each of the air vents is in air communication with each of the internal spaces.

* * * * *